United States Patent
Gordon et al.

(10) Patent No.: US 7,693,764 B1
(45) Date of Patent: Apr. 6, 2010

(54) SYSTEMS AND METHODS FOR ASSESSING PROPERTY VALUE FRAUD

(75) Inventors: J. Douglas Gordon, Arlington, VA (US); Pamela W. Sims, Arlington, VA (US); Aohua Chen, Herndon, VA (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 1158 days.

(21) Appl. No.: 10/892,392

(22) Filed: Jul. 16, 2004

(51) Int. Cl.
*G06Q 40/00* (2006.01)
(52) U.S. Cl. .............................. 705/35; 705/38; 705/39
(58) Field of Classification Search ................ 705/35
See application file for complete search history.

(56) References Cited

U.S. PATENT DOCUMENTS

| | | | | |
|---|---|---|---|---|
| 5,995,947 A | * | 11/1999 | Fraser et al. ................. | 705/38 |
| 2002/0103750 A1 | * | 8/2002 | Herzfeld ...................... | 705/38 |
| 2002/0133371 A1 | * | 9/2002 | Cole ............................ | 705/1 |
| 2003/0093366 A1 | * | 5/2003 | Halper et al. ................. | 705/38 |
| 2004/0030629 A1 | * | 2/2004 | Freeman et al. .............. | 705/36 |
| 2004/0236621 A1 | * | 11/2004 | Eder ............................ | 705/10 |

OTHER PUBLICATIONS

PR Newswire [Foreclosure.com Adds FSBO Listings to Extensive Residential Foreclosure Database Through Agreement With Owners. com , New York: May 3, 2004. p. 1].*

* cited by examiner

*Primary Examiner*—Kambiz Abdi
*Assistant Examiner*—Nancy Mehta
(74) *Attorney, Agent, or Firm*—Finnegan, Henderson, Farabow, Garrett & Dunner, LLP

(57) ABSTRACT

Systems and methods consistent with the present invention provide an indication of whether a mortgage loan is likely to involve property value fraud, such as a property involved in mortgage flipping. In one embodiment, a method includes receiving information representative of the property, the information including foreclosure information on the property and a rate of foreclosures corresponding to a region in which the property is located; and determining an indication based on one or more rules and the received information, the indication representative of a likelihood that the mortgage loan application involves property value fraud.

24 Claims, 9 Drawing Sheets

| |
|---|
| Loan/Reference Number |
| Requestor (i.e., the lender) |
| Address of property (E.G., street, city, state, and ZIP code) |
| Foreclosure information (number of foreclosures in the past 2 ½ years) |
| Rate of foreclosures in the region associated with the property |
| Borrower's name |
| Borrower's Property value of the property (e.g., appraised value) |
| Proposed sales price |
| Borrower's Income (as stated by the borrower) |
| Borrower's occupation |
| Borrower's years in current occupation |
| Total loan amount |
| Property Type (a flag indicating whether the loan is for a condominium, town house, single family home, 2-4 unit dwelling, or multifamily dwelling) |
| Borrower's Credit Information (e.g., credit score(s), delinquencies, loan limits, outstanding balances, and/or ratios of credit limit to outstanding balance) |
| Source of Credit Information (1 for lender, 2 for Credit Repository) |
| Combined Point Value is an estimate from a database containing property estimates in a region, such as within a ZIP code, county, or state. |
| HV Score |

FIG. 6

| 1. | FRAUD SCORE = 100 |
|---|---|
| 2. | +4*PRIOR_FORECLOSURES |
| 3. | +2*RATE_OF_FORECLOSURES |
| 4. | +2*CREDIT_SCORE |
| 5. | +0*LIKELIHOOD_APPRAISAL_FAULTY |
| 6. | |
| 7. | |
| 8. | |
| 9. | If FRAUD_SCORE < 300 then FRAUD_SCORE = 300\** scaling score to a range **\ |
| 10. | If FRAUD_SCORE > 900 then FRAUD_SCORE = 900 |

FIG. 7

Sample Web Page With Result

Prepared For:   Lender Name   Loan Number: 0001

FRAUD SCORE REPORT for 5 BURBANK STREET

BORROWER INFORMATION:

Borrower Name: My Name
Street Address: 5 BURBANK STREET
City: Rochester   State: NY   Zip: 14621 – 1234

Scores below 500 are at highest risk
Scores below 600 are at moderate risk
Scores above 700 have lowest risk

FRAUD SCORE: 300

FIG. 8

SYSTEMS AND METHODS FOR ASSESSING PROPERTY VALUE FRAUD

BACKGROUND OF THE INVENTION

I. Field of the Invention

The present invention generally relates to financial systems and to systems and methods for processing financial information. More particularly, the invention relates to systems and methods for processing financial information, such that the processing provides an indication that a mortgage loan is likely to involve property value fraud.

II. Background and Material Information

In the real estate industry, there is a fraudulent practice known as "mortgage flipping." Mortgage flipping refers to an illegal scheme in which real estate speculators defraud a mortgage lender by inducing them to loan more money on a property than the property is actually worth. The scheme works as follows: First, a home is bought at its normal fair market price. Then, the new owner-seller offers the home for sale at a significantly higher price, usually supported by an inflated, fraudulent, appraisal. A purchaser then agrees to purchase the home at the inflated purchase price. The purchaser is typically a cohort of the new owner-seller. Moreover, the purchaser is typically someone that cannot qualify for a mortgage, e.g., a homeless person. As such, the new owner-seller and/or the purchaser may submit fraudulent documents to induce the lender into approving the loan. For example, the purchaser may submit false lease agreements, employment information, and/or a fraudulent appraisal. The lender is thus induced into making a loan that would not have been approved but for its reliance on the fraudulent documents. The fraudulent scheme continues when the new owner-seller then sells the house to the cohort purchaser at the inflated price. The new owner-seller makes a very large profit, i.e., the difference between the normal fair market value and the inflated, fraudulently based sales price. Following the plan, the cohort purchaser of the home then defaults on the mortgage loan causing the lender to initiate foreclosure proceedings against the home that secures the loan. Under the best of circumstances, the mortgage lender may succeed in selling the home for its fair market value, but in any event is unlikely to recover the inflated sales price. Consequently, the lender experiences a loss. Moreover, since the property sale was a sham and not an earnest sale to someone intending to own and occupy the home, the foreclosure property might be neglected and become a blight in the neighborhood until a legitimate buyer purchases the property. Further, such frauds are difficult to detect because the home usually has a lower market value than the comparable homes in the area (e.g., the lower market value home may have been an abandoned home or one that was in gross disrepair, and therefore the values of other homes in the neighborhood would not be comparable to the lower market value home, as they would be for a more typical property in the neighborhood). As such, systems and methods to detect such fraudulent schemes are needed.

SUMMARY OF THE INVENTION

Accordingly, the present invention is directed to systems and methods for processing financial information. More particularly, the invention relates to systems and methods for processing financial information, such that the processing provides an indication of whether the mortgage loan (or proposed loan) is likely to be a fraudulent transaction or likely to have been based on fraudulent property information.

A financial system consistent with the systems and methods of the present invention may determine an indication of whether a mortgage loan application for a property is likely to involve fraud. Systems and methods consistent with an embodiment of the present invention may receive information representative of the property, the information including foreclosure information on the property and a rate of foreclosures corresponding to a region in which the property is located. Moreover, such systems and methods may determine the indication based on one or more rules and the received information, the indication representative of a likelihood that the mortgage loan application is based on fraudulent information.

Additional features and advantages of the invention will be set forth in part in the description that follows or may be learned by practice of the invention. The features and advantages of the invention may be realized and attained by the systems and methods particularly described in the written description and claims hereof as well as in the appended drawings.

It is to be understood that both the foregoing general description and the following detailed description are exemplary and explanatory only and are not restrictive of the invention, as described. Further features or variations may be learned in addition to those expressly set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings:

FIG. 6 illustrates exemplary information used to determine an indication of the presence of fraud in accordance with systems and methods consistent with the present invention;

FIG. 7 shows an exemplary model for determining the indication of the presence of fraud in accordance with systems and methods consistent with the present invention;

FIG. 8 depicts an exemplary web page interface for providing the indication of the presence of fraud in accordance with systems and methods consistent with the present invention.

DETAILED DESCRIPTION

Reference will now be made in detail to the invention, examples of which are illustrated in the accompanying drawings. Wherever possible, the same reference numbers will be used throughout the drawings to refer to the same or like parts.

Systems and methods consistent with the present invention permit a financial entity, using a computing platform (or computer), to determine whether a mortgage loan is likely to involve fraudulent property value, such as mortgages associated with a fraudulent mortgage flip.

Figure 1:
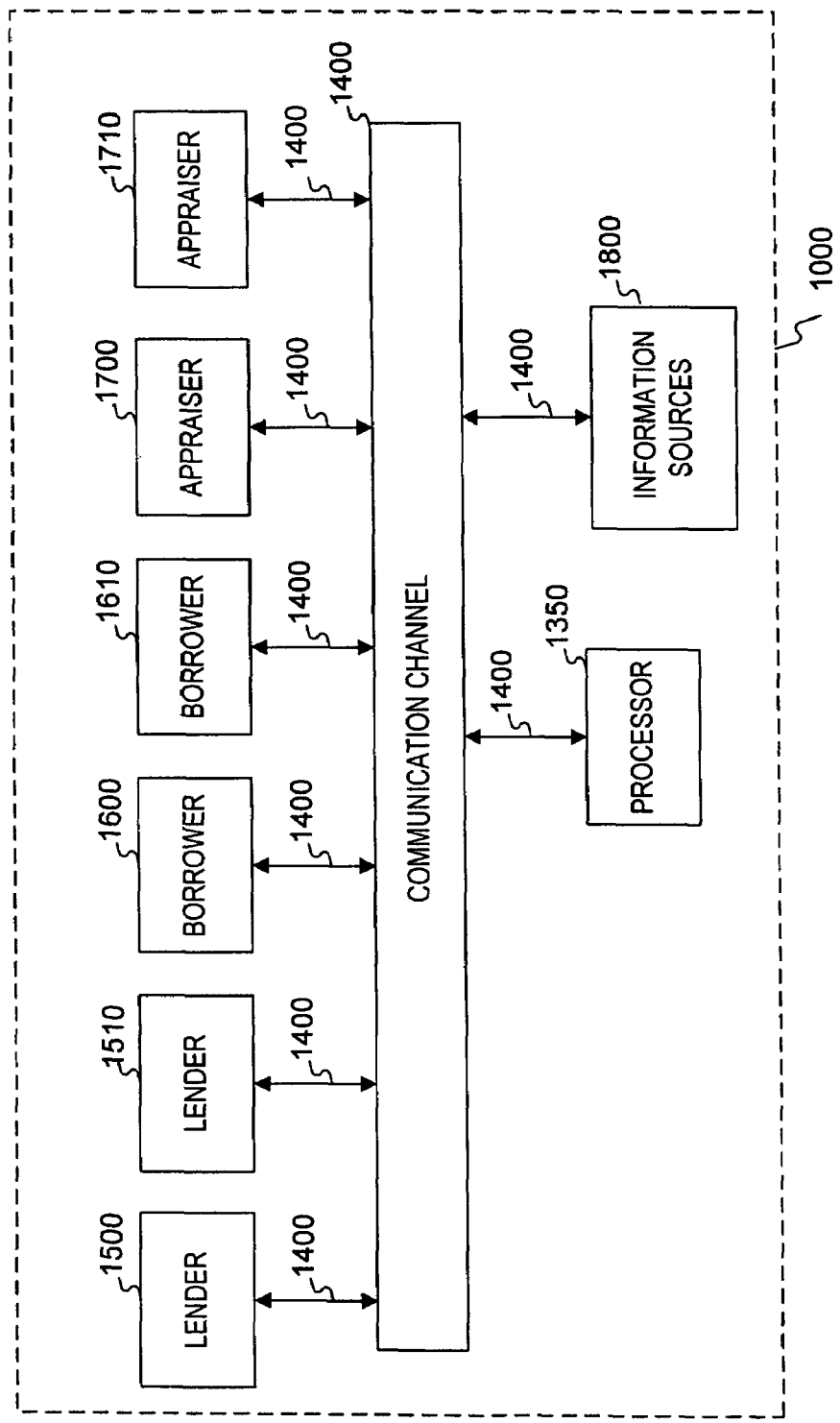
FIG. 1 illustrates an exemplary system environment in accordance with systems and methods consistent with the present invention.

FIG. 1 shows an exemplary system 1000 for providing an indication, of whether a mortgage loan is the subject of a mortgage flipping scheme. The indication may be in the form of a likelihood, probability, score, or flag that enables a financial entity to readily determine whether the mortgage loan it is evaluating or has acquired involved property value fraud. When it is likely that the mortgage loan involves property value fraud, a lender may take some type of additional action. For example, the lender may request an independent in-person appraisal of the property or an automated home value appraisal of the property—comparing the appraisal to the alleged sale price of the property. In some cases, the lender may even notify legal authorities of a possible fraud. As used herein, the phrase "mortgage loan" means a loan the repayment of which is secured by real property and includes a proposed mortgage loan transaction as exemplified by a mortgage loan application and/or an executed mortgage loan (including associated aspects of the loan transaction such as appraisals, income verifications, credit verifications, and any other aspects typically associated with the mortgage loan). As used herein, the phrase "appraisal" means any type of assessment (or estimate) of value.

Referring to FIG. 1, system 1000 includes a communication channel 1400, one or more lenders 1500, 1510, one or more borrowers 1600, 1610, one or more appraisers 1700, 1710, information sources 1800, and a processor 1350.

The lenders 1500, 1510 may include a financial entity, such as a bank, mortgage bank, mortgage broker, mortgage originator, and any other entity that would benefit from knowing an indication of whether the mortgage loan is the subject of a fraud. The borrowers 1600, 1610 may include an entity, such as a consumer, seeking a mortgage loan. The appraisers 1700, 1710 may include an entity that provides an estimate of the market value of a property. The processor 1350 may include an entity capable of processing information to determine an indication of whether the mortgage loan involves property value fraud. The indication may then be provided to, for example, a lender, a borrower, an appraiser, or any other entity requesting the indication. The information sources 1800 may include internal, external, proprietary, and/or public databases, such as financial databases and demographic databases.

In one embodiment, the information sources 1800 may include the following: foreclosure information for the property; borrower information including credit and/or salary information provided by credit repositories, such as TransUnion LLC (TransUnion), Equifax Inc. (Equifax), and Experian; real property information from sources of such information as ForeclosureFreeSearch.com, International Data Management Inc. (IDM), First American Corporation (First American), Multiple Listing Services (MLS), and county real property (or real property tax) records.

Figure 2:
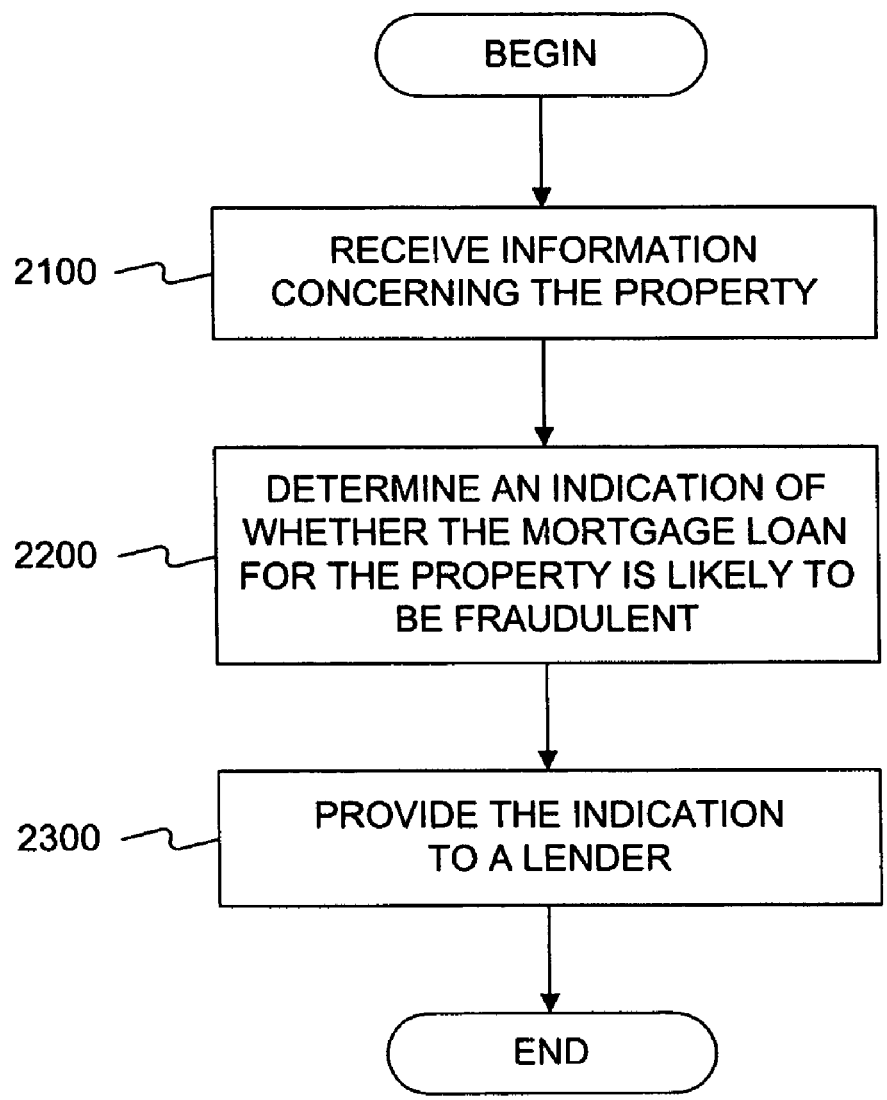
FIG. 2 is an exemplary flowchart for providing an indication that a mortgage loan is based on fraudulent information about property value.

FIG. 2 is a flowchart depicting exemplary steps for providing an indication of whether a mortgage loan is likely to involve property value fraud (e.g., the subject of fraudulent mortgage flipping scheme). Referring to FIGS. 1 and 2, processor 1350 may begin by receiving through communication channel 1400 from lender 1500 information concerning the property (step 2100). The received information may include, for example, information describing the property that is the subject of the mortgage loan (referred to herein as "the property" or "the subject property"). For example, the received information may include an address for the property. Based on the received address information, processor 1350 may receive additional information, such as a proposed sale price for the property, any prior foreclosures on the property, and property valuation information (e.g., appraisal information and/or automated valuation estimates) for the subject property and for the region associated with the subject property. In some embodiments, the received information may further include information describing the borrower, such as one or more of the following: the borrower's name, address, occupation, years in occupation (or experience), Social Security Number (SSN), and any other information typically associated with a mortgage loan application. Furthermore, the prior foreclosure information may include whether the property has been the subject of a foreclosure in the past, such as a foreclosure within the past 6 months or 2½ years. The prior foreclosure information may also include foreclosure rate information representative of the rate of foreclosure within the region associated with the property (e.g., the percentage of foreclosures within the subject property's ZIP Code) and/or any changes to the foreclosure rate of the region (e.g., increases or decreases in foreclosure rate in the region when compared to a previous month, quarter, or year).

Next, the processor 1350 may determine, based on the received information, an indication of whether the mortgage loan application is likely to involve property value fraud (e.g., a mortgage flipping scheme) (step 2200). For example, processor 1350 may determine that the property has been the subject of a foreclosure in the last 2½ years, the ZIP Code associated with the property has experienced a 25% increase in foreclosures, and that the proposed sale price is 25% greater than a valuation estimate provided by an automated home valuation estimation tool, such as property value estimates provided by Home Value Explorer™ available from Freddie Mac. Processor 1350 may then determine that the mortgage loan is at risk of involving property value fraud based on the received information, e.g., based on whether the property has been the subject of a foreclosure within the past 2½ years, whether there have been any changes in the foreclosure rate in the region associated with the subject property, and whether the proposed sale price is greater than the appraisal. Processor 1350 may then provide to a lender an indication of such risk, which may be in the form of a flag (e.g., Yes, No, True, or False), a score, a percentage, or a likelihood (step 2300). For example, processor 1350 may provide lender 1500 with a flag value of "1" that indicates that the property is at risk of being fraudulent. Lender 1500 may then decide to take further action, such as reject the loan, order another independent appraisal of the property, or further scrutinize the loan application.

Figure 3:
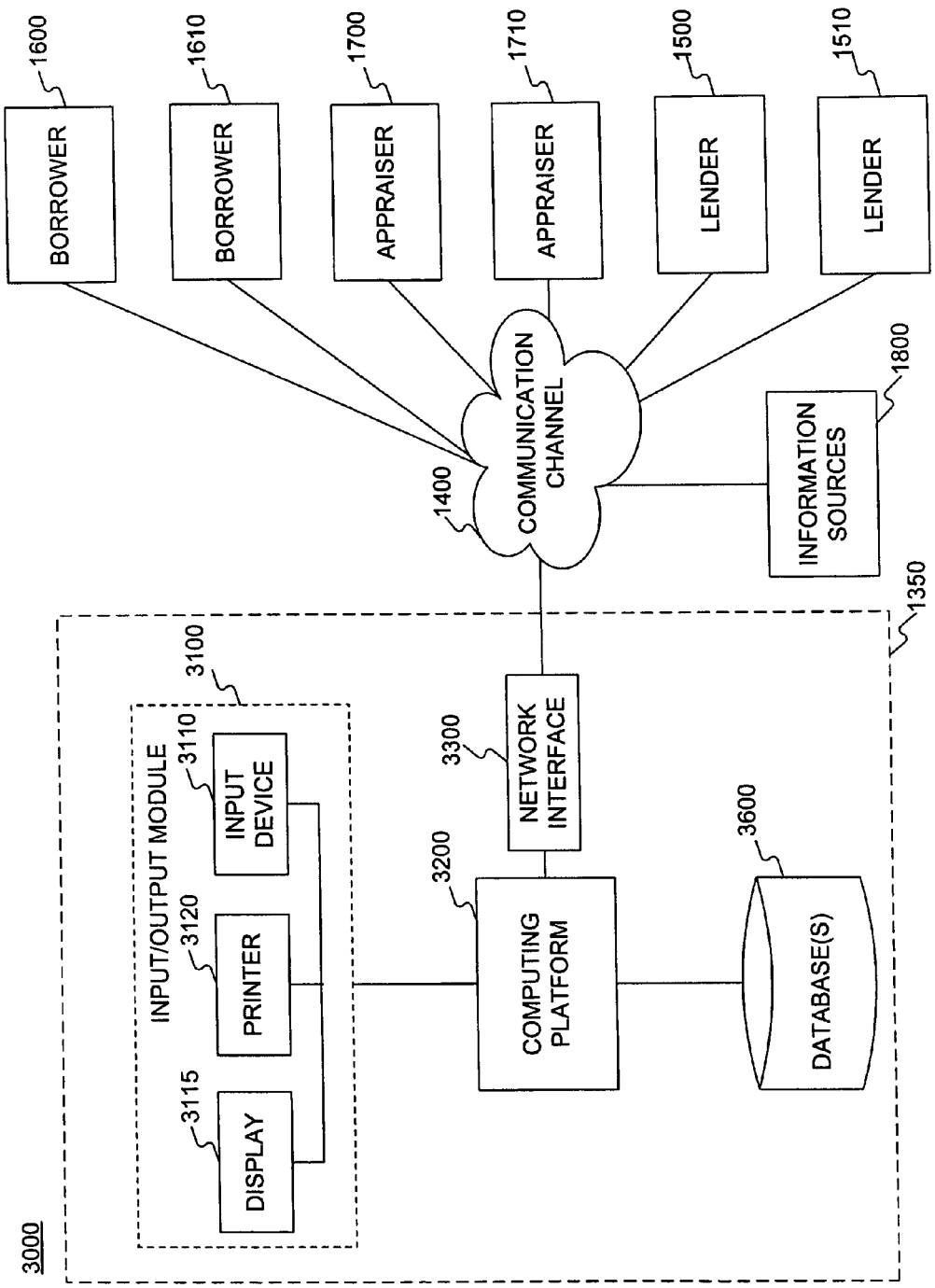
FIG. 3 is another an exemplary system environment in accordance with systems and methods consistent with the present invention.

FIG. 3 illustrates another exemplary system environment 3000 consistent with the systems and methods of the present invention. As illustrated in FIG. 3, the system 3000 includes processor 1350, lenders 1500, 1510, borrowers 1600, 1610, appraisers 1700, 1710, information sources 1800, and a communication channel 1400. The processor 1350 may also include an input/output (I/O) module 3100, a computing platform 3200, a network interface 3300, and one or more databases 3600.

In one embodiment consistent with FIG. 3, computing platform 3200 may include a data processor such as a PC, UNIX server, or mainframe computer for performing various functions and operations. Computing platform 3200 may be implemented, for example, by a general purpose computer or data processor selectively activated or reconfigured by a stored computer program, or may be a specially constructed computing platform for carrying-out the features and operations disclosed herein. Moreover, computing platform 3200 may be implemented or provided with a wide variety of components or systems including, for example, one or more of the following: one or more central processing units, a co-processor, memory, registers, and other data processing devices and subsystems.

Communication channel 1400 may include, alone or in any suitable combination a telephony-based network, a local area network (LAN), a wide area network (WAN), a dedicated intranet, the Internet, or a wireless network. Further, any suitable combination of wired and wireless components and systems may be incorporated into the communication channel 1400. Although the computing platform 3200 may connect to lenders 1500, 1510 through communication channel 1400, computing platform 3200 may connect directly to lenders 1500, 1510.

Although the communication channel 1400 is depicted in FIG. 3 as bi-directional, a skilled artisan would recognize that unidirectional communication links may be used instead.

I/O module 3100 may be implemented with a wide variety of devices to receive and/or provide information. Referring to FIG. 3, I/O module 3100 may include an input device 3110, a display 3115, and a printer 3120. Input device 3110 may also include a keyboard, a mouse, a disk drive, a telephone, or any other suitable input device for receiving information. Display 3115 and/or printer 3120 may be used to provide, inter alia, the indication to a lender that a mortgage loan is likely to involve property value fraud, such as a fraudulent mortgage flip. Although FIG. 3 only illustrates a single I/O module 3100, a plurality of modules 3100 may also be used.

Computing platform 3200 also communicates with I/O module 3100 using connections or communication links, as illustrated in FIG. 3. Alternatively, communication between computing platform 3200 and I/O module 3100 may be achieved using a network (not shown) similar to that described above for the communication channel 1400 or a bus. A skilled artisan would recognize that computing platform 3200 may be located in the same location or at a geographically separate location from I/O module 3100 by using dedicated communication links or a network.

Network interface 3300 may facilitate data exchange between the communication channel 1400 and computing platform 3200. In one aspect of the invention, network interface 3300 may permit a connection to at least one or more of the following networks: an Ethernet network, an Internet protocol network, a telephone network, a radio network, a cellular network, a wireless local area network, or any other network.

The database 3600 may store information received from borrowers, lenders, brokers, appraisers, and/or any other information sources. For example, database 3600 may store information received from information sources 1800 such as information from one or more of the following: TransUnion LLC (TransUnion), Equifax Inc. (Equifax), Experian, ForeclosureFreeSearch.com, International Data Management Inc. (IDM), First American Corporation (First American), county property (or tax) records, Acxiom, DataQuick, and/or U.S. Department of Housing and Urban Development (HUD). Although database 3600 is shown in FIG. 3 as being located with the computing platform 3200, a skilled artisan would recognize that the database(s) may be located anywhere (and in multiple locations) and connected to the computing platform via direct links or networks. Similarly, although information sources 1800 are depicted in FIG. 3 as separate from the computing platform 3200 and processor 1350, a skilled artisan would recognize that the information sources 1800 may be located anywhere (and in multiple locations) and connected to the computing platform via direct links or networks.

Figure 4:
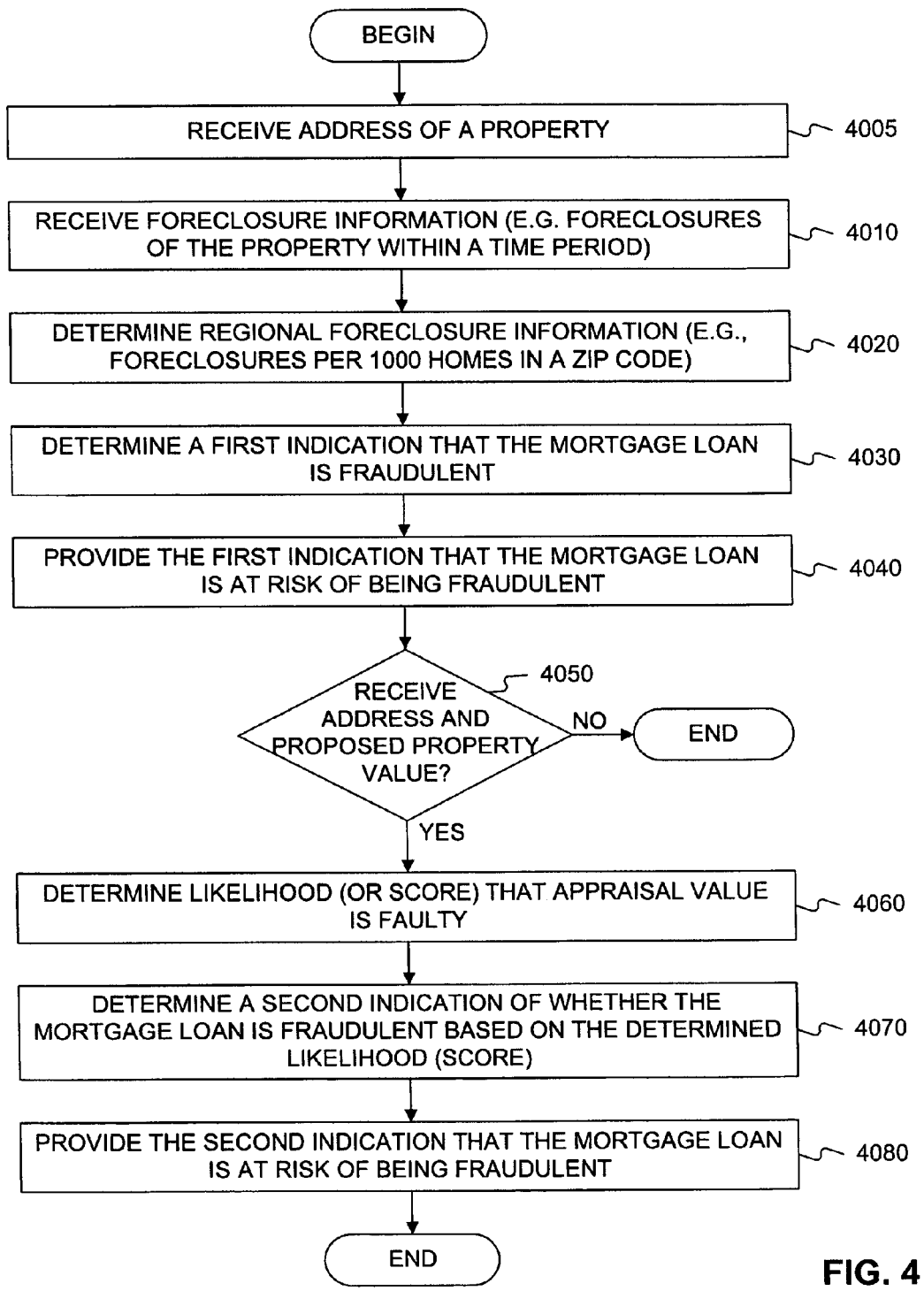
FIG. 4 is another exemplary flowchart for providing indications that a mortgage loan is likely to be based on fraudulent property value information in accordance with systems and methods consistent with the present invention.

FIG. 4 depicts another flowchart with exemplary steps for providing an indication that a mortgage loan is at risk of involving property value fraud, such as a fraudulent mortgage flip. Referring to FIGS. 3 and 4, processor 1350 may receive information, such as the property address (step 4005); receive foreclosure information for the property (step 4010); determine foreclosure rate information for the region associated with the property (step 4020); determine a first indication that the mortgage loan involves property value fraud (step 4030); and provide the first indication that the subject property mortgage loan involves fraud (step 4040). If processor 1350 receives the subject property address and its proposed property value (e.g., the sales price of the property and/or the appraisal of the property), processor 1350 may then determine the likelihood of whether the proposed property value is faulty (steps 4050-4060). Processor 1350 determines, based on the determined likelihood of step 4060, a second indication of whether the mortgage loan involves property value fraud (step 4070). Processor 4070 then provides the second indication to, for example, a lender (step 4080).

To receive information, such as the property address (step 4005), processor 350 may receive from a lender, such as lender 1500, the address of the subject property through communication channel 1400. For example, the address may be included in a mortgage application submitted by a borrower or a broker to lender 1500.

To receive foreclosure information for the property (step 4010), processor 1350 can run a query, based on the received address, a database, such as database 3600, or information sources 1800, for foreclosure information of the property. In some embodiments, processor 1350 receives and then stores in database 3600 foreclosure information from county foreclosure records. In some other embodiments, processor 1350 receives foreclosure information from consolidated foreclosure databases, such as ForeclosureFreeSearch.com. Moreover, when receiving property foreclosure information, processor 1350 may query for only recent foreclosure information. For example, processor 1350 may only request (and then receive) foreclosures on the property that occurred within the past 2½ years. Although other time periods may be used instead, in some embodiments more accurate determinations of fraud are predicted when a 2½ year time period is used.

To determine foreclosure rate information for the region associated with the subject property (step 4020), processor 1350 may identify a region associated with the property and then determine the rate of foreclosures in that region. A region may be a street, a zip+4, a neighborhood, a ZIP code, a census tract, a city, a county, a state, or a Metropolitan Statistical Area associated with the subject property. For illustrative purposes, the following refers to the property ZIP code as a region, although other regional variation types could be used instead. For example, processor 1350 may determine the foreclosure rate of properties in the same ZIP code as the subject property. Moreover, that rate may be determined on a periodic basis. As such, any increases in the foreclosure rate may also be determined. The following table illustrates exemplary foreclosure rates and corresponding rates of increases for a ZIP code.

TABLE 1

Exemplary Foreclosure Rate Information

| PERIOD (E.G., MONTH) | FORECLOSURE RATE FOR ZIP CODE 14621 | CHANGE FROM PREVIOUS PERIOD |
|---|---|---|
| January | 2% | 0 |
| February | 2% | 0 |
| March | 2% | 0 |
| Current Month is April | 26% | 13X |

Referring to Table 1, the foreclosure rate for ZIP code 14621 appears relatively stable at 2% for the first three months of the year. Then, April shows a 13-fold increase in foreclosure rates. When processor 1350 receives a property address in ZIP code 14621, processor 1350 retrieves information, such as the information depicted in Table 1.

To determine a first indication that the mortgage loan involves property value fraud (step 4030), processor 1350 may use one or more rules to determine whether the mortgage loan is likely to involve fraud. For example, processor 1350 may include three rules as follows: The first rule may be defined as follows: (1) if there has been a foreclosure on the property within 2½ years then the property is four times more likely to involve fraud. The second rule may defined as follows: (2) if there has been a 50% or more increase in the rate of foreclosures in the region, then the property is two times more likely to involve fraud. The third rule may be defined as follows: (3) if there has been a foreclosure on the property within 2½ years and if there has been a 50% or more increase in the rate of foreclosures in the region, then the mortgage loan on the property or the underwriting is eight times more likely to involve fraud. One of ordinary skill in the art will now recognize that other rules may be used instead. Alternatively, processor 1350 may use a model to determine the likelihood that a mortgage loan is likely to involve property value fraud. Such a model is described in greater detail below.

To provide the first indication that the mortgage loan involves property value fraud (step 4040), processor 1350 may notify lender 1500 by sending an email to lender 1500 though communication channel 1400, calling lender 1500, or setting a flag in a database storing the mortgage loan application information for the subject property. The database may be database 3600 or any other databases.

Although the first flag may be sufficient for the lender to "flag" the mortgage loan as likely to involve property value fraud, in some cases a lender may want to know whether the mortgage loan application involves property value fraud with a greater degree of confidence. In those cases, lender 1500 may provide the subject property address and its proposed property value (e.g., its appraised value provided with the mortgage loan application) (step 4005).

Processor 1350 may then determine the likelihood of whether the property value is also likely to be faulty (step 4060), which may be used to further confirm that the mortgage loan involves fraud. To determine whether the appraisal value for the property is faulty, processor 1350 may compare the proposed property value to an automated home valuation estimate. Systems and methods of determining home valuation estimates are described in one or more of the following applications: U.S. patent application Ser. No. 08/730,289, filed Oct. 11, 1996, entitled "METHOD FOR COMBINING HOUSE PRICE FORECASTS," U.S. patent application Ser. No. 09/115,831, filed Jul. 15, 1998, entitled "SYSTEM AND METHOD FOR PROVIDING HOUSE PRICE FORECASTS BASED ON REPEAT SALES MODEL," U.S. patent application Ser. No. 09/134,161, filed Aug. 14, 1998, entitled "SYSTEM AND METHOD FOR PROVIDING PROPERTY VALUE ESTIMATES," and U.S. patent application Ser. No. 09/728,061, filed Dec. 4, 2000, entitled "METHOD FOR FORECASTING HOUSE PRICES USING A DYNAMIC ERROR CORRECTION MODEL," all of which are incorporated by reference in their entirety. If the proposed property valuation is substantially more than the estimate of property value provided by the automated home value estimate, processor 1350 may flag the proposed property value as faulty. For example, if the proposed property valuation is 25% or more higher than the automated home value estimate, the proposed property value may be faulty. Alternatively, different levels of excessive proposed value may be given scores indicating relatively higher risk as the excessive value grows. Alternatively, if the proposed value is two standard deviations or more above the property values provided by the automated home value estimate (dividing the difference in value by the forecasted standard deviation of the automated estimate), the proposed value may be faulty. Alternatively, processor 1350 may determine a Home Value Score that provides an indication of whether the appraisal value for a property is faulty based on a variety of factors. Systems and methods for determining the Home Value (HV) Score are described in U.S. application Ser. No. 10/094,806 entitled "SYSTEMS AND METHODS FOR HOME VALUE SCORING," which is incorporated herein by reference in its entirety. For example, the HV Score can be used to assess whether the property value and its corresponding appraisal, provided by an appraiser, is likely to be faulty. Specifically, processor 1350 may determine that the property has a HV Score of 200, representing that it is very likely that the appraisal for the property is faulty. On the other hand, if processor 1350 determines that the property has a HV Score of 800, the appraisal is likely to be reliable. Alternatively, the neighborhood information can be used in conjunction with the HV Score to provide a combined property value fraud score.

To determine a second indication of whether the mortgage loan involves property value fraud (step 4070), processor 1350 may use one or more rules. In one embodiment, processor 1350 uses the three rules of step 4030 and one additional rule based on whether the proposed property value (or its appraisal) is likely to be faulty. Specifically, the first rule may, for example, define that if there has been a foreclosure on the property within 2½ years, then the property is four times more likely to involve fraud. The second rule may, for example, define that if there has been a 50% increase or more in the rate of foreclosures, then the mortgage loan is two times more likely to involve fraud. The third rule may, for example, define that if there has been a foreclosure on the property within 2½ years and if there has been a 50% increase or more in the rate of foreclosures, then the property is eight times more likely to involve fraud. The fourth rule may, for example, define that if the HV Score indicates that it is more likely than not that the proposed property value (or its appraisal) is likely to be faulty (e.g., a Home Value Score of 500 or less on a 200 to 800 scale) and rules 1-3 are true, then processor 1350 may provide lender 1500 with a second indication that the mortgage loan application is likely to involve fraud (step 4080). The indication can be provided to lender 1500 in any form, such as a flag associated with a stored mortgage loan application, an email, a phone call, or even a displayed value on a web page.

The risk indication may consist of a range, such as, for example, 200 to 800, 1 to 10, or 300 to 900. Alternatively, an alphabet-based or alphanumeric-based scale may also be used instead. For example, an alphabet-based approach may include a range, such as of "A" to "F", while an alphanumeric-based approach may include a range of "A1" to "A10." In yet another alternative, the risk indication may be in the form of a flag. For example, a flag value of "1" may indicate that the property is likely to be the subject of a fraudulent mortgage flip—requiring further investigation by a lender or an appraiser. A flip flag value of "0" may indicate that it is less likely that the property is the subject of a fraudulent transaction, and as such, the lender or appraiser does not have to take any additional measures with respect to the fraud.

Figure 5:
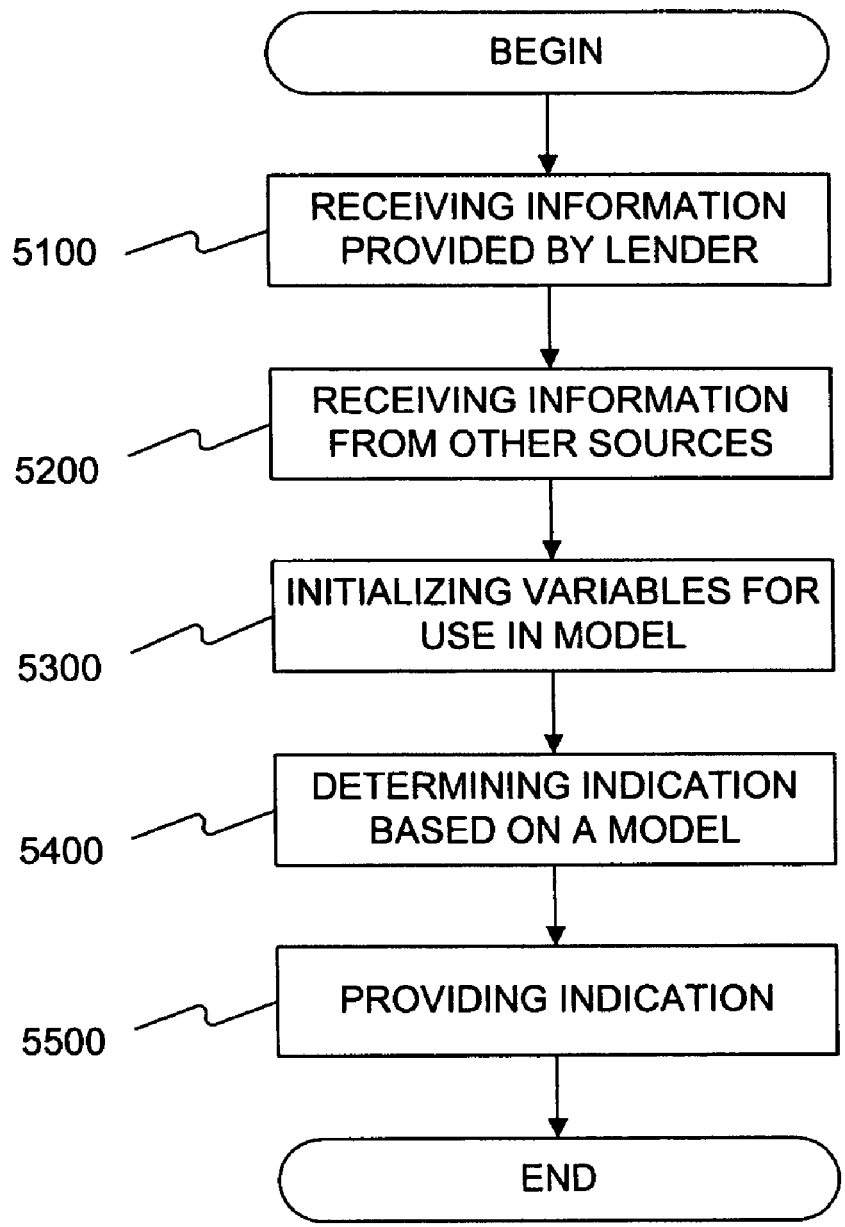
FIG. 5 is another exemplary flowchart for providing an indication of the presence of property value fraud in accordance with systems and methods consistent with the present invention.

FIG. 5 depicts another flowchart with exemplary steps for providing an indication that a property is at risk of being the subject of a fraudulent transaction, such as fraudulent mortgage flipping. Referring to FIGS. 3 and 5, processor 1350 receives information, such as mortgage loan application information (step 5100). Processor 1350 may receive additional information regarding the property including foreclosure information for the property, foreclosure rate information for the region associated with the subject property, and HV Score information (step 5200). Processor 1350 then initializes one or more variables in a model (step 5300); determines, based on the model, an indication of whether the mortgage loan application is likely to involve property value fraud (step 5400); and provides the indication to a lender (step 5500).

To receive information provided by a lender, processor 1350 may receive from lender 1500 through communication channel 1400 mortgage loan information relating to the loan application (step 5100). Such mortgage loan information may include information about the borrower(s) and the property to be used as security for the loan. Moreover, processor 1350 may receive additional information regarding the property including foreclosure information for the property, foreclosure rate information for the property (such as for the region as described above with respect to steps 4010-4020), and the HV Score of the property (step 5200). FIG. 6 depicts exemplary information received in steps 5100 and 5200. Referring to FIG. 6, FIG. 6 includes: a mortgage loan reference number; the identity of the requestor of the fraud indication (e.g., the lender); the subject property address; foreclosure information; foreclosure rate information; the name(s) of borrower(s); value of the subject property (e.g., the appraised value); the subject property sales price; borrower income information; borrower's occupation and experience; total mortgage loan amount; property type (e.g., condominium, townhouse, single family home, 2-4 unit home, and multi-family dwelling); borrower credit history and the source of the credit information; an estimate of value for comparable properties in the region (labeled combined point value); and the HV Score.

Referring again to FIG. 5, to initialize one or more variables of a model (step 5300), processor 1350 uses one or more of the information objects received in steps 5100-5200 to initialize the variables of the model. FIG. 7 depicts an exemplary model listing just a few of the variables that can be used in the model. The model provides an output that serves as an indication of whether the mortgage loan application is likely to involve property value fraud based on the information received in steps 5100-5200. Referring to FIG. 7, the processor 1350 may initialize each of the variables based on the received information. Table 2 below depicts exemplary variables and their initialized values.

TABLE 2

Initialized Variables

Prior_Foreclosures = quantity of foreclosures in the past 2½ years.
Rate_of_Foreclosures = 10 if rate of foreclosures has increased by 10% from the previous month, 50 if the rate has increased 50%, from the previous month, 100 if the rate of foreclosures has increased 100% from the previous 6 months, else 0.
Credit_Score = 1 if the credit score is in the top 50% of all borrowers, else 0.
Likelihood_Appraisal_Faulty = HV Score, else 0.

Processor 1350 then determines the product of each variable (e.g., Prior_Foreclosures) initialized in step 5300 and its corresponding model coefficient (e.g., "+4"). Processor 1350 may then sum all of the products to produce a Fraud Score (lines 1-5). Moreover, in one aspect of the invention, the Fraud Score is scaled into a range of 300 to 900 such that a Fraud Score of 300 suggests that a mortgage loan application is probably fraudulent. On the other hand, a Fraud Score of 900 would indicate that the mortgage loan application is probably not fraudulent. FIG. 7 at lines 9-10 shows such scaling. Processor 1350 then provides the indication to a lender based on the Fraud Score.

One of ordinary skill in the art will recognize that in FIG. 7, the coefficients 100, 4, 2, 2, and 0 are only exemplary and that other values may be used instead as described below with respect to FIG. 9.

In some embodiments, the Fraud Score serves as the indication that is provided to the lender. In others, the Fraud Score is provided to the lender in the form of a flag, such as a TRUE or FALSE flag, with a flag having a value of "1" (TRUE) representing a fraudulent mortgage application, while a flag value of "0" (FALSE) representing a mortgage application not believed to involve property value fraud. Returning to the example of a 300-900 Fraud Score Range, a Fraud Score of less than 600 could be flagged as TRUE.

FIG. 8 depicts an exemplary web page for providing a Fraud Score. For example, the processor 1350 may provide the Fraud Score to the lender 1500 through communication channel 1400. As shown in FIG. 8, the Fraud Score may provide lender 1500 with an indication in the form of a value, for example, between 300 and 900, with the actual value indicative of whether the mortgage loan application is likely to involve property value fraud. Alternatively, processor 1350 may provide a flag value (e.g., a value of TRUE or FALSE) to a database storing information representative of the mortgage loan application.

By way of example, FIG. 8 depicts that a Fraud Score below 500 may be considered at "highest risk" of being faulty, suggesting to lender 1500 that a second valuation of the property (preferably by an appraiser who may physically inspect the premises) may be appropriate. A Fraud Score between 500-600 may be considered at "moderate risk" of being faulty, suggesting to lender 1500 that a review of the entire mortgage loan application may be appropriate. When a Fraud Score is above 700, the mortgage loan application is at "lowest risk" of being faulty, suggesting to the lender 1500 that no further review of the property value or loan application is necessary.

Figure 9:
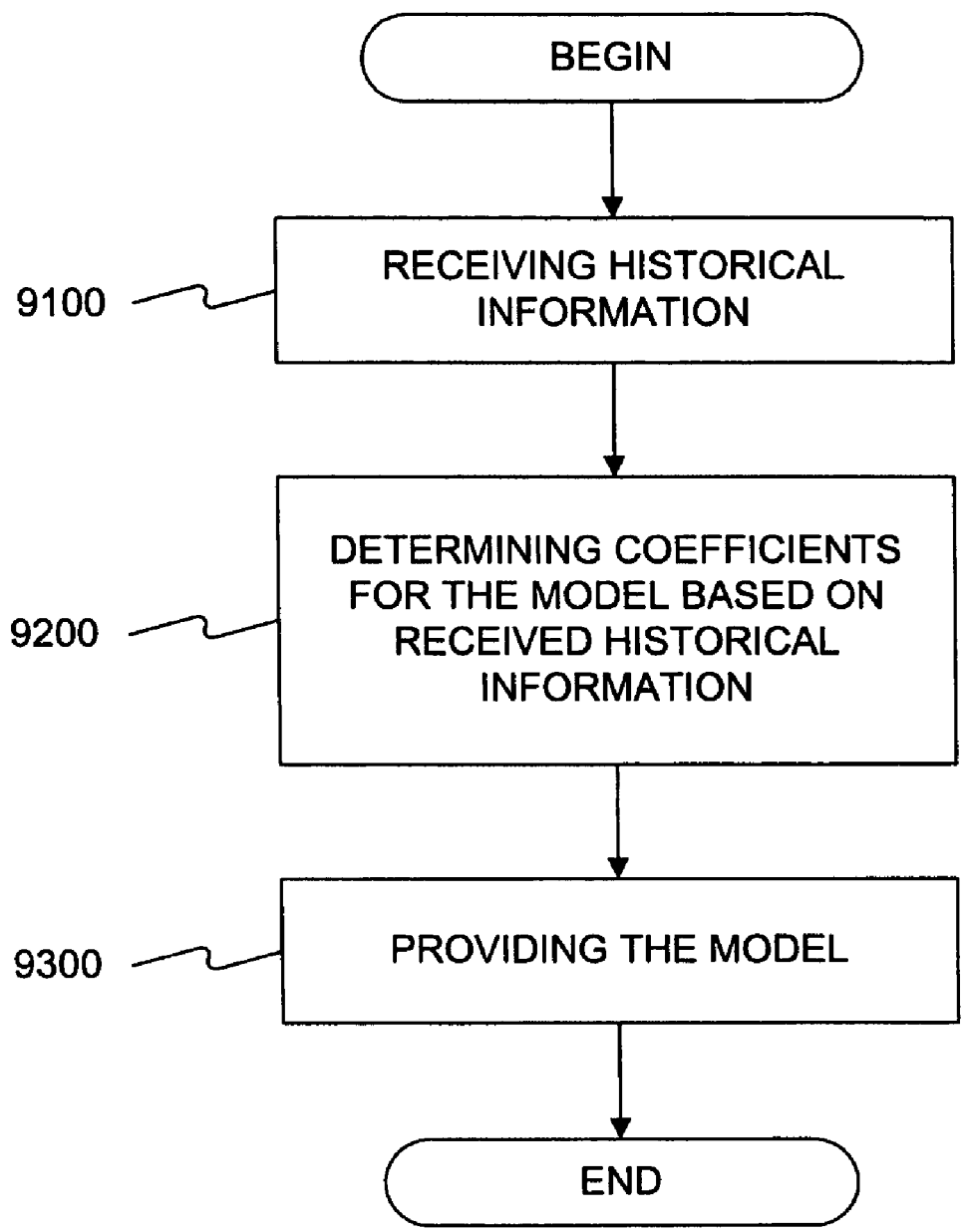
FIG. 9 is another exemplary flowchart for generating a model used to determine indications of the presence of fraud in accordance with systems and methods consistent with the present invention.

In one embodiment, processor 1350 may also generate the Fraud Score model, as depicted in FIG. 9. The processor 1350 may begin by receiving historical (or truth) information (step 9100); determine the Fraud Score model based on the received historical information (step 9200); and end when it provides the Fraud Score model (step 9300).

The processor 1350 may receive historical information for one or more mortgage loans from various sources of information, such as database 3600 or the information sources 1800 (step 9100). The historical information may include any information that might indicate whether a mortgage loan is likely to involve property value fraud including one or more of the following: property information (including property value information), foreclosure information, foreclosure rate information for the region associated with the subject property, borrower information including income, credit and occupation, loan information, income information, credit information, and demographic information. The demographic information may also describe one or more of the following: the borrower, the borrower's property, and any other demographics, such property types, characteristics, average and/or median property values for comparable properties in the same region associated with the subject property. For example, the historical information may include the information depicted in FIG. 6. Moreover, for each of the mortgage loans, the received information includes some type of verification of fraud. For example, the received information may represent 100 mortgage loan applications, of which 20 of the loans were "verified" as fraudulent after the buyer defaulted on the loan and a lender reviewed the borrower's original mortgage loan application.

To determine the Fraud Score model, the processor 1350 may process the historical information received in step 9100 (step 9200). The received historical information may be processed based on quantitative techniques, such as statistics (e.g., logistic regression and PROBIT), neural networks, and/or any other approach that provides a model capable of providing a Fraud Score for a mortgage loan application given historical information. For example, standard statistical tools, such as tools commercially available from the SAS Institute, Inc., may be used to determine the Fraud Score model coefficients (see, e.g., FIG. 7 at coefficients "100," "+4," "+2," "+2," and "+0") based on the received historical information such that the Fraud Score model provides Fraud Scores or an indication of fraud. Processor 1350 may then provide the determined Fraud Score model to one or more entities (e.g., lenders 1500, 1510 or appraisers 1700, 1710) permitting those entities to determine (or use) the Fraud Scores.

The systems disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer, other apparatus, or software, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method for determining at least one indication of whether a mortgage loan application for a property is likely to involve property value fraud, the method comprising:

receiving, by a data processor, information representative of the property from a database, the information including foreclosure information on the property and a current rate of foreclosures corresponding to a region in which the property is located;

determining, using the data processor when evaluating the mortgage loan application and prior to issuing a mortgage based on the mortgage loan application, a first indication based on one or more rules and the received information, the first indication representative of a likelihood that the mortgage loan application involves property value fraud, the one or more rules being implemented by the data processor and including:

comparing the current rate of foreclosures to a previous rate of foreclosures, adjusting the first indication by a first predefined amount when the current rate of foreclosures has increased by a second predefined amount, determining whether there has been a foreclosure on the property within a predetermined amount of time, adjusting the first indication by a third predefined amount when there has been a foreclosure within the predetermined amount of time, and adjusting the first indication by a fourth predefined amount that is a multiple of the first predefined amount and the third predefined amount when the current rate of foreclosures has increased by the second predefined amount and the property has been foreclosed on within the predetermined amount of time;

calculating, using the data processor, an appraisal score indicating whether an appraisal value of the property is faulty; and determining, using the data processor and when evaluating the mortgage loan application, a second indication based on the one or more rules and the appraisal score, the second indication representative of a likelihood that the mortgage loan application involves property fraud.

2. The method of claim 1, further comprising:

receiving information representative of a borrower for the mortgage loan application, the information including at least one of a credit history, a credit score, income, occupation, previous addresses and employers.

3. The method of claim 1, wherein receiving further comprises:

receiving information including an appraisal of the property.

4. The method of claim 3, wherein determining the second indication further comprises:

determining the second indication based on one or more rules and the received information.

5. The method of claim 1, further comprising:

providing at least one of the first indication and the second indication in the form of a flag.

6. The method of claim 1, further comprising:
providing at least one of the first indication and the second indication in the form of a score.

7. The method of claim 6, further comprising:
scaling the score into a range of score values, such that a low score value within the range of score values corresponds to a high likelihood that the mortgage loan application involves property value fraud and a high score value within the range of score values corresponds to a low likelihood that the mortgage loan application involves property value fraud.

8. The method of claim 6, further comprising:
scaling the score into a range of score values, such that a low score value within the range of score values corresponds to a low likelihood that the mortgage loan application involves property value fraud and a high score value within the range of score values corresponds to a high likelihood that the mortgage loan application involves property value fraud.

9. The method of claim 1, further comprising:
using as the region an area associated with a ZIP code of the property.

10. The method of claim 1, further comprising:
using foreclosures on the property within the past 30 months as the foreclosure information.

11. A method for determining whether a mortgage loan application for a property is likely to involve property value fraud, the method comprising:
receiving, by a data processor, information representative of the property from a database, the information including foreclosure information on the property and a current rate of foreclosures corresponding to a region in which the property is located;
determining, using the data processor when evaluating the mortgage loan application and prior to issuing a mortgage based on the mortgage loan application, a first indication based on a model and the received information, the first indication representative of a likelihood that the mortgage loan application involves property value fraud, the model being executed by the data processor and including:
comparing the current rate of foreclosures to a previous rate of foreclosures,
adjusting the first indication by a first predefined amount when the current rate of foreclosures has increased by a second predefined amount,
determining whether there has been a foreclosure on the property within a predetermined amount of time,
adjusting the first indication by a third predefined amount when there has been a foreclosure within the predetermined amount of time, and
calculating, using the data processor, an appraisal score indicating whether an appraisal value of the property is faulty; and
determining, using the data processor and when evaluating the mortgage loan application, a second indication based on the model and the appraisal score, the second indication representative of a likelihood that the mortgage loan application involves property fraud.

12. The method of claim 11, wherein receiving further comprises:
receiving information including an appraisal of the property.

13. The method of claim 11, further comprising:
using, as the appraisal score, a Home Value Score.

14. The method of claim 11, wherein determining the second indication further comprises:
determining the second indication based on the model, the received information, and the appraisal score.

15. The method of claim 11, further comprising:
providing the first indication in the form of a flag.

16. The method of claim 11, further comprising:
providing the first indication in the form of a score.

17. The method of claim 11, further comprising:
providing the second indication in the form of a flag.

18. The method of claim 11, wherein the model employs a statistical technique.

19. The method of claim 11, further comprising:
receiving information representative of a borrower for the mortgage loan application, the information including at least one of a credit history, a credit score, income, occupation, previous addresses and employers.

20. A system for determining at least one indication of whether a mortgage loan application for a property is likely to involve property value fraud, the system comprising:
means for receiving information representative of the property, the information including foreclosure information on the property and a current rate of foreclosures corresponding to a region in which the property is located;
means for determining, when evaluating the mortgage loan application and prior to issuing a mortgage based on the mortgage loan application, a first indication based on one or more rules and the received information, the first indication representative of a likelihood that the mortgage loan application involves property value fraud, the one or more rules including:
comparing the current rate of foreclosures to a previous rate of foreclosures,
adjusting the first indication by a first predefined amount when the current rate of foreclosures has increased by a second predefined amount,
determining whether there has been a foreclosure on the property within a predetermined amount of time,
adjusting the first indication by a third predefined amount when there has been a foreclosure within the predetermined amount of time, and
means for calculating an appraisal score indicating whether an appraisal value of the property is faulty; and
means for determining, when evaluating the mortgage loan application, a second indication based on the one or more rules and the appraisal score, the second indication representative of a likelihood that the mortgage loan application involves property fraud.

21. A system for determining at least one indication of whether a mortgage loan application for a property is likely to involve property value fraud, the system comprising:
a processor; and
a memory, communicatively connected to the processor,
wherein the processor and the memory are configured to perform a method comprising:
receiving information representative of the property, the information including foreclosure information on the property and a current rate of foreclosures corresponding to a region in which the property is located;
determining, when evaluating the mortgage loan application and prior to issuing a mortgage based on the mortgage loan application, a first indication based on one or more rules and the received information, the first indication representative of a likelihood that the mortgage loan application involves property value fraud, the one or more rules including:
comparing the current rate of foreclosures to a previous rate of foreclosures, adjusting the first indication by a first predefined amount when the current rate of foreclosures has increased by a second predefined amount, determining whether there has been a foreclosure on the property within a predetermined amount of time, adjusting the first indication by a third predefined amount when there has been a foreclosure within the predetermined amount of time, and adjusting the first indication by a fourth predefined amount that is a multiple of the first predefined amount and the third predefined amount when the current rate of foreclosures has increased by the second predefined amount and the property has been foreclosed on within the predetermined amount of time;

calculating an appraisal score indicating whether an appraisal value of the property is faulty; and determining, when evaluating the mortgage loan application, a second indication based on the one or more rules and the appraisal score, the second indication representative of a likelihood that the mortgage loan application involves property fraud.

22. A system for determining whether a mortgage loan application for a property is likely to involve property value fraud, the system comprising:

a processor; and a memory, communicatively connected to the processor, wherein the processor and the memory are configured to perform a method comprising:

receiving information representative of the property, the information including foreclosure information on the property and a current rate of foreclosures corresponding to a region in which the property is located;

determining, when evaluating the mortgage loan application and prior to issuing a mortgage based on the mortgage loan application, a first indication based on one or more rules and the received information, the first indication representative of a likelihood that the mortgage loan application involves property value fraud, the one or more rules including:

comparing the current rate of foreclosures to a previous rate of foreclosures, adjusting the first indication by a first predefined amount when the current rate of foreclosures has increased by a second predefined amount, determining whether there has been a foreclosure on the property within a predetermined amount of time, adjusting the first indication by a third predefined amount when there has been a foreclosure within the predetermined amount of time, and calculating an appraisal score indicating whether an appraisal value of the property is faulty; and determining, when evaluating the mortgage loan application, a second indication based on the one or more rules and the appraisal score, the second indication representative of a likelihood that the mortgage loan application involves property fraud.

23. A tangible computer-readable medium containing computer-executable instructions to configure a data processor to perform a method for determining at least one indication of whether a mortgage loan application for a property is likely to involve property value fraud, the method comprising:

receiving information representative of the property, the information including foreclosure information on the property and a current rate of foreclosures corresponding to a region in which the property is located;

determining, when evaluating the mortgage loan application and prior to issuing a mortgage based on the mortgage loan application, a first indication based on one or more rules and the received information, the first indication representative of a likelihood that the mortgage loan application involves property value fraud, the one or more rules including:

comparing the current rate of foreclosures to a previous rate of foreclosures, adjusting the first indication by a first predefined amount when the current rate of foreclosures has increased by a second predefined amount, determining whether there has been a foreclosure on the property within a predetermined amount of time, adjusting the first indication by a third predefined amount when there has been a foreclosure within the predetermined amount of time, and adjusting the first indication by a fourth predefined amount that is a multiple of the first predefined amount and the third predefined amount when the current rate of foreclosures has increased by the second predefined amount and the property has been foreclosed on within the predetermined amount of time;

calculating an appraisal score indicating whether an appraisal value of the property is faulty; and determining, when evaluating the mortgage loan application, a second indication based on the one or more rules and the appraisal score, the second indication representative of a likelihood that the mortgage loan application involves property fraud.

24. A tangible computer-readable medium containing computer-executable instructions to configure a data processor to perform a method for determining whether a mortgage loan application for a property is likely to involve property value fraud, the method comprising:

receiving information representative of the property, the information including foreclosure information on the property and a current rate of foreclosures corresponding to a region in which the property is located;

determining, when evaluating the mortgage loan application and prior to issuing a mortgage based on the mortgage loan application, a first indication based on one or more rules and the received information, the first indication representative of a likelihood that the mortgage loan application involves property value fraud, the one or more rules including:

comparing the current rate of foreclosures to a previous rate of foreclosures, adjusting the first indication by a first predefined amount when the current rate of foreclosures has increased by a second predefined amount, determining whether there has been a foreclosure on the property within a predetermined amount of time, adjusting the first indication by a third predefined amount when there has been a foreclosure within the predetermined amount of time, and calculating an appraisal score indicating whether an appraisal value of the property is faulty; and determining, when evaluating the mortgage loan application, a second indication based on the one or more rules and the appraisal score, the second indication representative of a likelihood that the mortgage loan application involves property fraud.

* * * * *